US012417737B2

(12) United States Patent
Lai

(10) Patent No.: US 12,417,737 B2
(45) Date of Patent: Sep. 16, 2025

(54) DISPLAY PANEL AND DISPLAY DEVICE

(71) Applicant: Xiamen Tianma Display Technology Co., Ltd., Fujian (CN)

(72) Inventor: Qingjun Lai, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/807,404

(22) Filed: Aug. 16, 2024

(65) Prior Publication Data

US 2024/0412684 A1 Dec. 12, 2024

(30) Foreign Application Priority Data

Aug. 31, 2023 (CN) .......................... 202311113023.9

(51) Int. Cl.
*G09G 3/3225* (2016.01)

(52) U.S. Cl.
CPC ... *G09G 3/3225* (2013.01); *G09G 2320/0233* (2013.01)

(58) Field of Classification Search
CPC ............... G09G 3/30–3291; G09G 2320/0233
See application file for complete search history.

(56) References Cited

U.S. PATENT DOCUMENTS

2022/0076618 A1* 3/2022 Lai ....................... G09G 3/3266
2024/0404476 A1* 12/2024 Yuan ........................ G09G 3/20

* cited by examiner

*Primary Examiner* — Hang Lin
(74) *Attorney, Agent, or Firm* — KDW FIRM PLLC

(57) ABSTRACT

Provided is a display panel. The display panel includes a pixel circuit and a driver circuit. The pixel circuit includes a drive module and a preset module. The preset module is configured to provide a preset signal for the drive module. The driver circuit is configured to provide a control signal for the preset module. At least part of the time period during which the display panel operates includes a transition phase. The transition phase is between the end of a retention frame of the first data refresh area and the start of a data write frame of the second data refresh area. Alternatively, the transition phase is between the end of a data write frame of the second data refresh area and the start of a retention frame of the first data refresh area.

12 Claims, 5 Drawing Sheets

DISPLAY PANEL AND DISPLAY DEVICE

CROSS-REFERENCE TO RELATED APPLICATION(S)

This application claims priority to Chinese Patent Application No. 202311113023.9 filed Aug. 31, 2023, the disclosure of which is incorporated herein by reference in its entirety.

TECHNICAL FIELD

The present application relates to the field of display technology and, in particular, to a display panel and a display device.

BACKGROUND

OLED (organic light-emitting diode) display screens are made of organic light-emitting diodes. OLEDs, with the characteristics of self-luminous pixels, high contrast, wide viewing angles, thinness, and low energy consumption, are widely used in various fields.

The current OLED display panels include pixel circuits and driver circuits. The driver circuits provide various types of drive signals to the pixel circuits to meet the display needs of different display areas. However, there is a large difference in brightness at the junction of the display areas, resulting in poor display effects.

SUMMARY

In view of this, embodiments of the present application provide a display panel and a display device. With the display panel and display device, the change of a preset signal can be completed in advance during a transition phase, and the influence of horizontal stripes at the connection between different display areas on the display effect of the display panel can be reduced.

In one aspect, embodiments of the present application provide a display panel. The display panel includes a pixel circuit, a driver circuit, a first data refresh area, and a second data refresh area.

The pixel circuit includes a drive module and a preset module. The preset module is configured to provide a preset signal for the drive module. The driver circuit is configured to provide a control signal for the preset module.

The data refresh frequency of the first data refresh area is F1, the data refresh frequency of the second data refresh area is F2, and F1<F2.

At least part of the time period during which the display panel operates includes a transition phase.

The transition phase is between the end of a retention frame of the first data refresh area and the start of a data write frame of the second data refresh area. During the transition phase, the preset signal changes from a first preset signal to a second preset signal, and the control signal controls the preset module to be turned off.

Alternatively, the transition phase is between the end of a data write frame of the second data refresh area and the start of a retention frame of the first data refresh area. During the transition phase, the preset signal changes from a second preset signal to a first preset signal, and the control signal controls the preset module to be turned off.

In another aspect, embodiments of the present application provide a display device. The display device includes the preceding display panel.

BRIEF DESCRIPTION OF DRAWINGS

To illustrate the technical solutions in the embodiments of the present application or the technical solutions in the related art more clearly, drawings used in the description of the embodiments or the related art will be briefly described below. Apparently, the drawings described below are merely embodiments of the present application, and those skilled in the art may acquire other drawings based on provided drawings on the premise that no creative work is done.

The structures, proportions, and sizes illustrated in the drawings of the description are only used to match the contents disclosed in the description for those familiar with this technology to understand and read and are not used to limit the conditions under which the present application can be implemented. Therefore, the structures, proportions, and sizes illustrated in the drawings of the description have no substantive technical significance. Any structural modification, change in proportional relationship, or adjustment of size should fall within the scope of the technical contents disclosed in the present application without affecting the effects and purposes that can be achieved by the present application.

DETAILED DESCRIPTION

Figure 1:
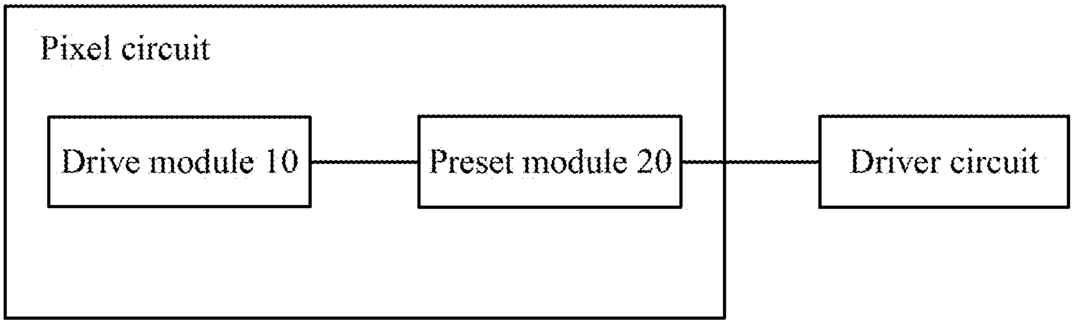
FIG. 1 is a diagram illustrating the structure of a pixel circuit according to an embodiment of the present application.

Features and exemplary embodiments of various aspects of the present application are described in detail below. The present application is described in detail in conjunction with the embodiments and the accompanying drawings, from which the object, technical solutions, and advantages of the present application are more apparent. It is to be understood that the embodiments described herein are intended only to explain and not to limit the present application. It is apparent to those skilled in the art that the present application may be implemented without some of these specific details. The description of the embodiments below is only to provide a better understanding of the present application by illustration of examples of the present application.

It is to be noted that in the present application, relationship terms such as first and second are used merely to distinguish one entity or operation from another entity or operation and do not necessarily require or imply any such actual relationship or order between these entities or operations. Additionally, the term "comprising", "including", or any other variant thereof is intended to encompass a non-exclusive inclusion so that a process, method, article, or device that includes a series of elements not only includes the expressly listed elements but also includes other elements that are not expressly listed or elements inherent to such a process, method, article, or device. In the absence of more restrictions, the elements defined by the statement "including a . . . " do not exclude the presence of additional identical elements in the process, method, article, or device that includes the elements.

It is to be noted that if not in collision, the embodiments and features therein in the present application may be combined with each other.

As described in the background technology, in the related art, OLED display panels include pixel circuits and driver circuits, and the driver circuits provide various types of drive signals to the pixel circuits so that the display needs of different display areas in the same display panels can be met. However, switching different display areas causes relatively large interference to the display panels, that is, the problem of horizontal stripes at the junction of the display areas is serious, the brightness difference is large, and the display effects are poor.

Based on the preceding technical problems, embodiments of the present application provide a display panel and a display device. The display panel includes a pixel circuit and a driver circuit. The pixel circuit includes a drive module and a preset module. The preset module is configured to provide a preset signal for the drive module. The driver circuit is configured to provide a control signal for the preset module. A first data refresh area and a second data refresh area exist when the display panel is working. The data refresh frequency F1 of the first data refresh area is smaller than the data refresh frequency F2 of the second data refresh area. At least part of the time period during which the display panel operates includes a transition phase. The transition phase is between the end of a retention frame of the first data refresh area and the start of a data write frame of the second data refresh area. During the transition phase, the preset signal changes from a first preset signal to a second preset signal, and the control signal controls the preset module to be turned off. Alternatively, the transition phase is between the end of a data write frame of the second data refresh area and the start of a retention frame of the first data refresh area. During the transition phase, the preset signal changes from a second preset signal to a first preset signal, and the control signal controls the preset module to be turned off. By the configuration of the transition phase, the preset signal is allowed to complete the jump in advance within the transition phase, thereby reducing the influence of horizontal stripes at the connection between different display areas on the display effect of the display panel.

For ease of understanding, a display panel and a display device provided by embodiments of the present application are described in detail below in conjunction with the accompanying drawings.

Figure 2:
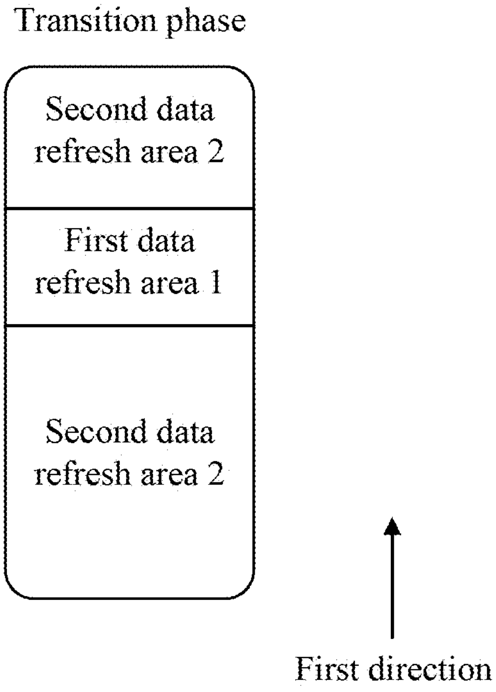
FIG. 2 is a diagram illustrating the structure of a display panel according to an embodiment of the present application.

As shown in FIG. 1, FIG. 1 is a diagram illustrating the structure of a pixel circuit according to an embodiment of the present application. FIG. 2 is a diagram illustrating the structure of a display panel according to an embodiment of the present application. The display panel includes a pixel circuit and a driver circuit. The pixel circuit includes a drive module 10 and a preset module 20. The preset module 20 is configured to provide a preset signal for the drive module 10. The driver circuit is configured to provide a control signal for the preset module 20.

The display panel also includes a first data refresh area 1 and a second data refresh area 2. The data refresh frequency of the first data refresh area 1 is F1, the data refresh frequency of the second data refresh area 2 is F2, and F1<F2. At least part of the time period during which the display panel operates includes a transition phase. The transition phase is between the end of a retention frame of the first data refresh area 1 and the start of a data write frame of the second data refresh area 2. During the transition phase, the preset signal changes from a first preset signal to a second preset signal, and the control signal controls the preset module to be turned off. Alternatively, the transition phase is between the end of a data write frame of the second data refresh area 2 and the start of a retention frame of the first data refresh area 1. During the transition phase, the preset signal changes from a second preset signal to a first preset signal, and the control signal controls the preset module to be turned off.

In the embodiments of the present application, the display panel has one or more data refresh areas in different working processes. For example, the display panel includes a first data refresh area in the first phase, and the display panel includes a first data refresh area and a second data refresh area in the second phase; the data refresh frequencies of the first data refresh area and the second data refresh area are different. The number of data refresh areas and the specific deployment positions of the data refresh areas on the display panel are not limited by the embodiments of the present application.

The functional circuit and implementation of the preset module in the embodiments of the present application should be determined in combination with actual application scenarios, and the type of the preset signal is not limited herein.

The data refresh frequency of the first data refresh area 1 is different from that of the second data refresh area 2. When transition is performed from the first data refresh area 1 to the second data refresh area 2, the retention frame of the first data refresh area 1 jumps to the data write frame of the second data refresh area 2. The jump process may cause the preset signal to change, resulting in horizontal stripes, and the difference of brightness of the display panel is large. To weaken the degree of horizontal stripes, a transition phase is added to the working phase of the display panel.

In the embodiments of the present application, a transition phase is set in at least part of the time period during which the display panel operates, and the length and position of the transition phase are not limited. In the transition phase, the preset signal changes, the control signal of the driver circuit controls the preset module 20 to be turned off, and the pixel circuit stops data refreshes. The preset signal changes from a first preset signal to a second preset signal in the transition phase, and then the control signal of the driver circuit controls the preset module 20 to be turned on. In this case, the second preset signal is provided to the drive module 10 so that the horizontal stripes generated when the frequency of the data refresh area changes can be weakened.

Similarly, when the second data refresh area 2 changes to the first data refresh area 1, the data write frame of the second data refresh area 2 may jump to the retention frame of the first data refresh area 1. The working phase of the display panel includes a transition phase where the preset signal is changed and the control signal of the driver circuit controls the preset module 20 to be turned off. Thus, the horizontal stripes are weakened accordingly.

In a possible embodiment, when the data write frame of the second data refresh area 2 starts, the control signal controls the preset module 20 to be turned on.

When the first data refresh area 1 changes to the second data refresh area 2, the change of the preset signal is completed in the transition phase. Starting from the data write frame of the second data refresh area 2, the control signal of the driver circuit controls the preset module 20 to be turned on, and the pixel circuit performs data refreshes. At this time, the first preset signal has changed to the second preset signal, and the horizontal stripes generated when the frequency of the data refresh area changes can be weakened.

In a possible embodiment, when the retention frame of the first data refresh area starts, the control signal controls the preset module to be turned on.

When the second data refresh area 2 changes to the first data refresh area 1, the change of the preset signal is completed in the transition phase. Starting from the retention frame of the first data refresh area 1, the control signal of the driver circuit controls the preset module 20 to be turned on, and the pixel circuit performs data refreshes. At this time, the second preset signal has changed to the first preset signal, and the horizontal stripes generated when the frequency of the data refresh area changes can be weakened.

Figure 3:
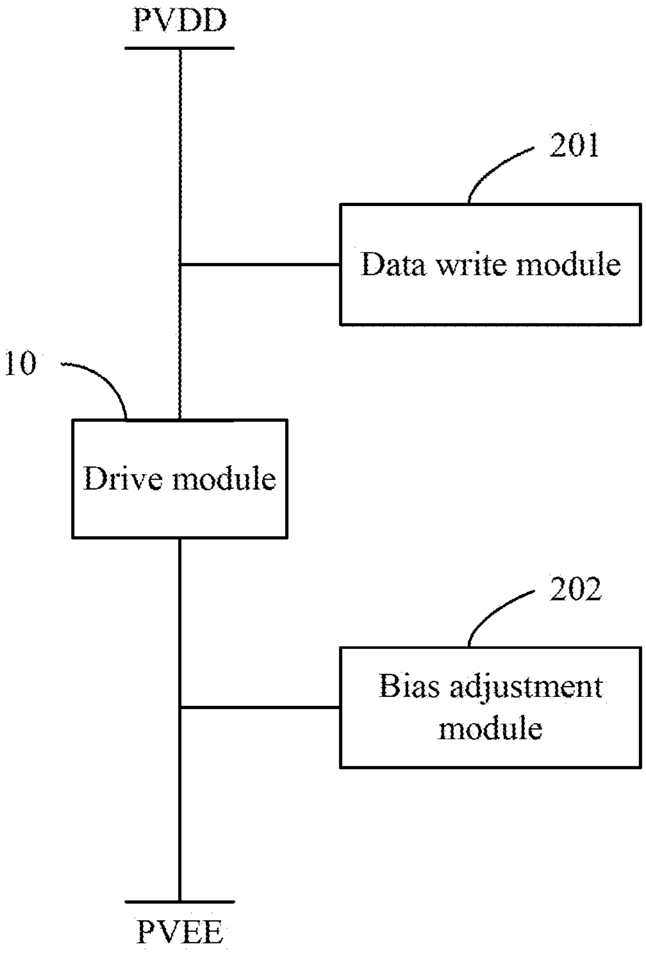
FIG. 3 is another diagram illustrating the structure of a pixel circuit according to an embodiment of the present application.

With reference to FIG. 3, FIG. 3 is another diagram illustrating the structure of a pixel circuit according to an embodiment of the present application. The pixel circuit includes a data write module 201 and a bias adjustment module 202. The data write module 201 is connected to a first end of the drive module 10 and is configured to provide a data signal for the drive module 10. The bias adjustment module 202 is connected to a second end of the drive module 10 and is configured to provide a bias adjustment signal for the drive module 10. The preset module 20 is any one of the data write module 201 and the bias adjustment module 202.

After the preset signal is changed, the control signal controls the preset module 10 to be turned on, the data write module 201 may provide a data signal source for the drive module 10, and the bias adjustment module 202 may provide a bias adjustment signal DVH for the drive module 10.

In a possible embodiment, the preset module 20 is the bias adjustment module 202, and the preset signal is the bias adjustment signal; the retention frame of the first data refresh area 1 receives the first preset signal, and the data write frame of the second data refresh area 2 receives the second preset signal; the voltage value of the first preset signal is not equal to the voltage value of the second preset signal.

When the preset module 20 is the bias adjustment module 202, the preset signal generated by the preset module 20 is specifically the bias adjustment signal DVH. During the change of the data refresh area, the display panel completes the change from the first preset signal to the second preset signal in the transition phase, and the preset signals received by the retention frame of the first data refresh area 1 and the data write frame of the second data refresh area 2 are different. That is, the drive module 10 of the first data refresh area 1 receives the first preset signal, and the drive module 10 of the second data refresh area 2 receives the second preset signal. The change of the voltage value of the preset signal is not fixed, and the voltage value may be increased or decreased. The voltage value of the first preset signal is different from the voltage value of the second preset signal.

In a possible embodiment, the preset module 20 is the data write module 201, and the preset signal is the data signal; the retention frame of the first data refresh area 1 receives the first preset signal, and the data write frame of the second data refresh area 2 receives the second preset signal; the transition phase is between the end of a retention frame of the first data refresh area 1 and the start of a data write frame of the second data refresh area 2.

When the preset module 20 is the data write module 201, the preset signal generated by the preset module 20 is specifically the data signal source. During the change of the data refresh area, the display panel completes the change from the first preset signal to the second preset signal in the transition phase, the drive module 10 of the first data refresh area 1 receives the first preset signal, and the drive module 10 of the second data refresh area 2 receives the second preset signal, so as to realize the change of the preset signal when the retention frame jumps to the data write frame.

Figure 4A:
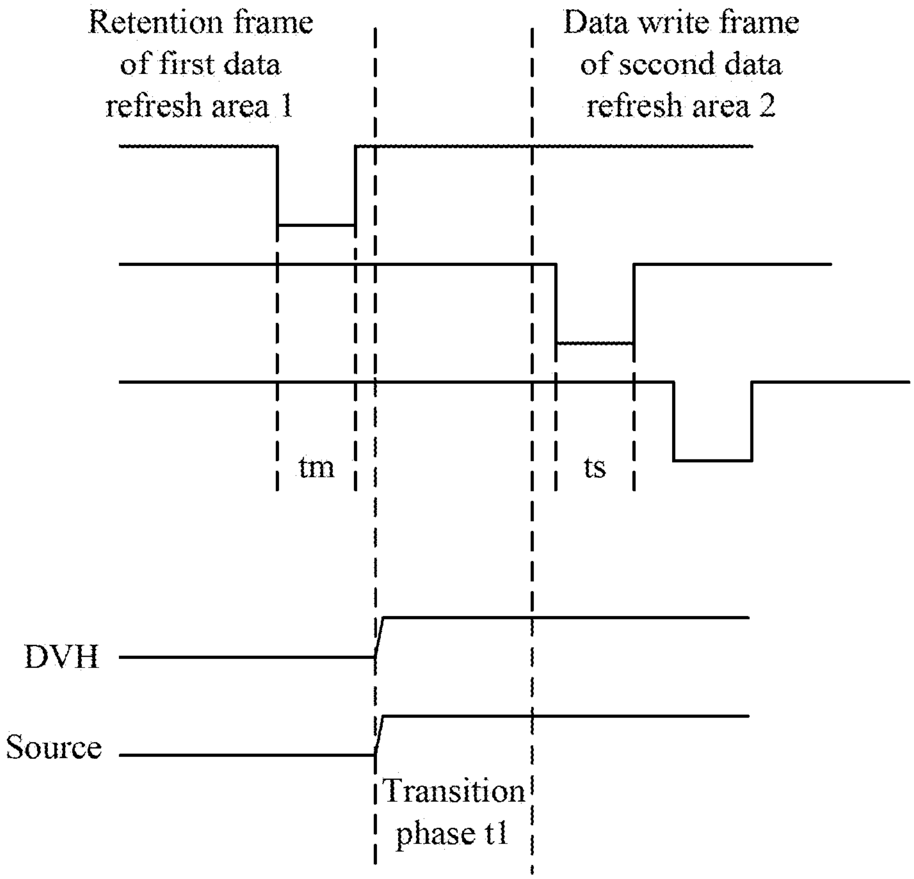
FIG. 4A is a waveform diagram before a transition phase according to an embodiment of the present application.
Figure 4B:
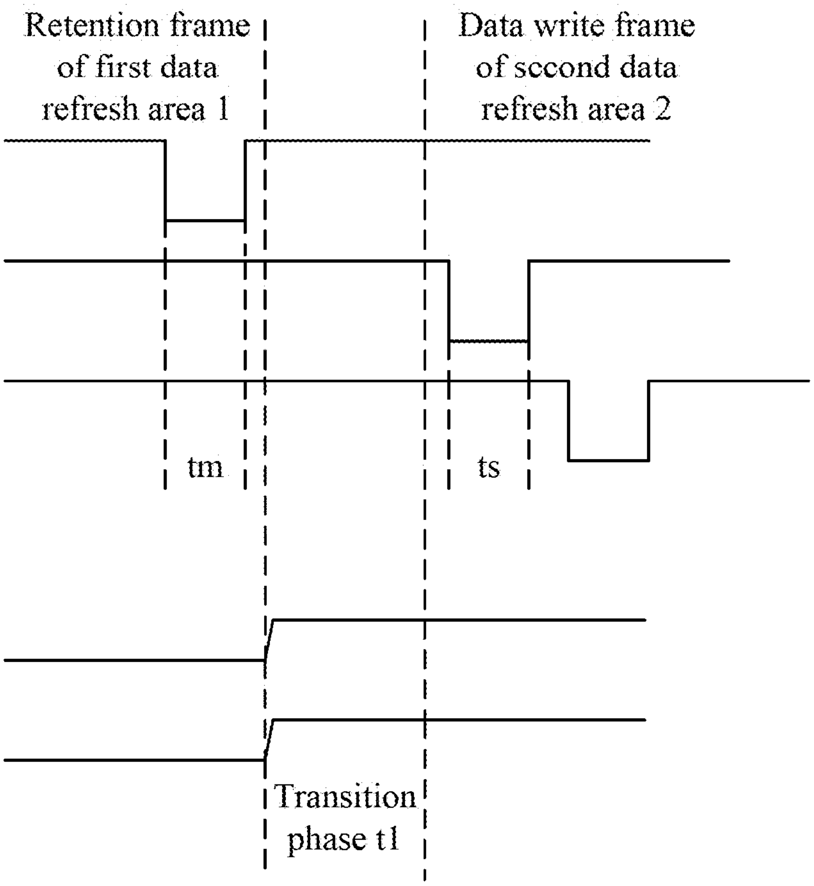
FIG. 4B is a waveform diagram of a transition phase according to an embodiment of the present application.

With reference to FIG. 4A and FIG. 4B, FIG. 4A is a waveform diagram before a transition phase according to an embodiment of the present application, and FIG. 4B is a waveform diagram of a transition phase according to an embodiment of the present application. In a possible embodiment, the duration of the transition phase is t1, the duration of the retention frame of the first data refresh area 1 is tm, and the duration of the data write frame of the second data refresh area 2 is ts, where $t1<tm$, and/or $t1<ts$.

In the transition phase, the preset signal changes from the first preset signal to the second preset signal to avoid the change of the preset signal caused by the jump from the low-frequency data refresh area to the high-frequency data refresh area. In the embodiment of the present application, the duration of the transition phase is less than the duration of the retention frame of the first data refresh area 1; additionally/alternatively, the duration of the transition phase is less than the duration of the data write frame of the second data refresh area 2. The duration of the transition phase can be flexibly adjusted by the preceding method.

For example, the duration of the transition phase may be 1 Hsync to 2 Hsync, which is not limited by the embodiment of the present application.

In a possible embodiment, the duration of the transition phase is t1; in the data write frame of the second data refresh area 2, the time period during which the control signal controls the preset module to be turned on is tc1, where $t1>tc1$.

The transition phase plays the role of transitioning the preset signal, and the duration of the transition phase is greater than the time period during which the control signal in the data write frame of the second data refresh area 2 controls the preset module 20 to be turned on, so as to ensure that the first preset signal is transitioned to the second preset signal.

In a possible embodiment, the duration of the transition phase is t1; in the retention frame of the first data refresh area 1, the time period during which the control signal controls the preset module 20 to be turned on is tc2, where $t1>tc2$.

The transition phase is configured to transition the first preset signal to the second preset signal, and the duration required for the transition phase is greater than the time period during which the control signal in the retention frame of the first data refresh area 1 controls the preset module 20 to be turned on, so as to ensure that sufficient time is available in the transition phase to complete the transition of the preset signal.

Figure 5:
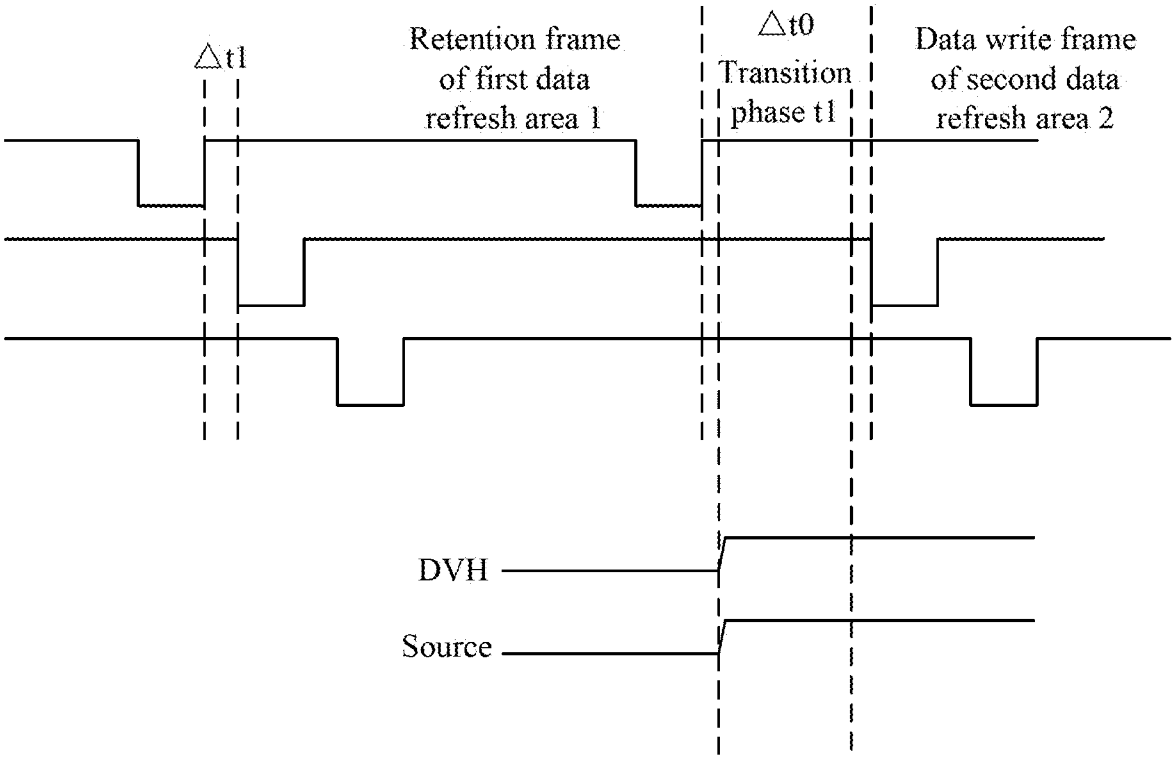
FIG. 5 is another waveform diagram of a transition phase according to an embodiment of the present application.

With reference to FIG. 5, FIG. 5 is another waveform diagram of a transition phase according to an embodiment of the present application.

In a possible embodiment, the first data refresh area 1 and the second data refresh area 2 in the embodiment of the present application are arranged in a first direction; the time difference between time when control signals control the preset module 20 to be turned on in retention frames of pixel circuits of two adjacent rows that extend in a second direction in the first data refresh area 1 is $\Delta t1$, and the second direction intersects with the first direction; the time difference between time when a control signal controls the preset module 20 to be turned on in a retention frame of a pixel circuit of a last row that extends in the second direction in the first data refresh area 1 and is adjacent to the second data refresh area 2 and time when a control signal controls the preset module 20 to be turned on in a data write frame of a pixel circuit of a first row that extends in the second direction in the second data refresh area 2 and is adjacent to the first data refresh area 1 is Δt0; where Δt0>Δt1.

The display panel includes a first data refresh area 1 and a second data refresh area 2 that are arranged in a first direction. Pixel circuits and light-emitting elements are arranged in the data refresh areas of the display panel in an array, and the pixel circuits extend in the second direction, where the second direction intersects with the first direction. The drive circuit provides control signals to each row of pixel circuits, and the pixel circuits implement data refreshes based on the control signals. The specific process of generating the control signal by the driver circuit is not described in detail in the embodiment of the present application.

During the transition from the first data refresh area 1 to the second data refresh area 2, the display panel is in a normal working phase. Between the retention frames of two adjacent pixel circuits in the first data refresh area 1, the time difference of the preset module 20 being enabled is Δt1, that is, Δt1 is the normal time difference of the preset module 20 starting a cycle in the normal working phase.

The display panel is in the transition phase. Between the retention frame of the first data refresh area 1 entering the transition phase and the data write frame about to transition to the second data refresh area 2, the time difference of the control signals controlling the preset module 20 to be turned on is Δt0, that is, the preset module 20 is turned off for a duration of Δt0 in the transition phase. The duration Δt0 when the preset module 20 is turned off includes the normal time difference Δt1 for starting a cycle and the transition time t1, so Δt0>Δt1.

In a possible embodiment, the second data refresh area 2 is transitioned into the first data refresh area 1. In the embodiment of the present application, the first data refresh area 1 and the second data refresh area 2 are arranged in a first direction; the time difference between time when control signals control the preset module 20 to be turned on in data write frames of pixel circuits of two adjacent rows that extend in the second direction in the second data refresh area 2 is Δt2, and the second direction intersects with the first direction. The time difference between time when a control signal controls the preset module 20 to be turned on in a retention frame of a pixel circuit of a last row that extends in the second direction in the first data refresh area 1 and is adjacent to the second data refresh area 2 and time when a control signal controls the preset module 20 to be turned on in a data write frame of a pixel circuit of a first row that extends in the second direction in the second data refresh area 2 and is adjacent to the first data refresh area 1 is Δt0, where ΔT0>Δt2.

The process of changing from the first data refresh area 1 to the second data refresh area 2 is the same and is not be repeated herein.

Figure 6:
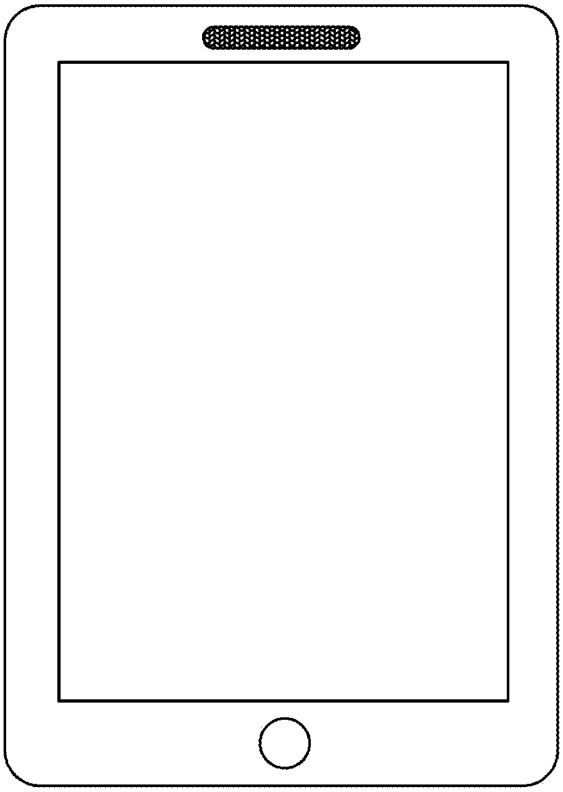
FIG. 6 is a diagram illustrating the structure of a display device according to an embodiment of the present application.

A display panel is provided based on the preceding embodiments. The embodiment of the present application also provides a display device. With reference to FIG. 6, FIG. 6 shows the display device according to the embodiment of the present application. The display device may include the display panel described above.

The functional blocks shown in the structural block diagrams described above may be implemented as hardware, software, firmware, or a combination thereof. When implemented in hardware, the hardware may be, for example, an electronic circuitry, an application-specific integrated circuit (ASIC), appropriate firmware, a plug-in, or a function card.

Specific examples are used in this description to illustrate the principles and embodiments of the present application. The preceding examples are only used to facilitate the understanding of the device and the core idea of the present application. The above are only preferred embodiments of the present application. It should be pointed out that due to the limitations of textual expression and the objective existence of infinite specific structures, for those skilled in the art, a number of improvements modifications, and changes can be made without departing from the principle of the present application, and the preceding technical features may also be combined appropriately; these improvements, modifications, changes, or combinations or the direct application of the concepts and technical solutions of the present application to other occasions without improvement, are within the scope of the present application.

What is claimed is:

1. A display panel, comprising:

a pixel circuit and a driver circuit, wherein the pixel circuit comprises a drive module and a preset module, the preset module is configured to provide a preset signal to the drive module, and the driver circuit is configured to provide a control signal to the preset module; and a first data refresh area and a second data refresh area, wherein a data refresh frequency of the first data refresh area is F1, a data refresh frequency of the second data refresh area is F2, and F1<F2;

wherein at least part of a time period during which the display panel operates comprises a transition phase;

the transition phase is between an end of a retention frame of the first data refresh area and a start of a data write frame of the second data refresh area; and during the transition phase, the preset signal changes from a first preset signal to a second preset signal, and the control signal controls the preset module to be turned off, or the transition phase is between an end of a data write frame of the second data refresh area and a start of a retention frame of the first data refresh area; and during the transition phase, the preset signal changes from a second preset signal to a first preset signal, and the control signal controls the preset module to be turned off.

2. The display panel of claim 1, wherein:

when the data write frame of the second data refresh area starts, the control signal controls the preset module to be turned on.

3. The display panel of claim 1, wherein:

when the retention frame of the first data refresh area starts, the control signal controls the preset module to be turned on.

4. The display panel of claim 1, wherein:

the pixel circuit comprises a data write module and a bias adjustment module;

the data write module is connected to a first end of the drive module and is configured to provide a data signal to the drive module; and the bias adjustment module is connected to a second end of the drive module and is configured to provide a bias adjustment signal to the drive module;

wherein the preset module is any one of the data write module and the bias adjustment module.

5. The display panel of claim 4, wherein:

the preset module is the bias adjustment module, and the preset signal is the bias adjustment signal;

the drive module of the first data refresh area receives the first preset signal during the retention frame of the first data refresh area, and the drive module of the second data refresh area receives the second preset signal during the data write frame of the second data refresh area; and a voltage value of the first preset signal is not equal to a voltage value of the second preset signal.

6. The display panel of claim 4, wherein:

the preset module is the data write module, and the preset signal is the data signal;

the drive module of the first data refresh area receives the first preset signal during the retention frame of the first data refresh area, and the drive module of the second data refresh area receives the second preset signal during the data write frame of the second data refresh area; and the transition phase is between the end of the retention frame of the first data refresh area and the start of the data write frame of the second data refresh area.

7. The display panel of claim 1, wherein a duration of the transition phase is t1, a duration of the retention frame of the first data refresh area is tm, and a duration of the data write frame of the second data refresh area is ts, wherein t1, tm and ts satisfy at least one of: t1<tm, or t1<ts.

8. The display panel of claim 1, wherein:

a duration of the transition phase is t1; and in the data write frame of the second data refresh area, a time period during which the control signal controls the preset module to be turned on is tc1; wherein t1>tc1.

9. The display panel of claim 1, wherein:

a duration of the transition phase is t1; and in the retention frame of the first data refresh area, a time period during which the control signal controls the preset module to be turned on is tc2; wherein t1>tc2.

10. The display panel of claim 1, wherein:

the first data refresh area and the second data refresh area are arranged in a first direction;

a time difference between time when control signals control the preset module to be turned on in retention frames of pixel circuits of two adjacent rows that extend in a second direction in the first data refresh area is Δt1, and the second direction intersects with the first direction; and a time difference between time when a control signal controls the preset module to be turned on in a retention frame of a pixel circuit of a last row that extends in the second direction in the first data refresh area and is adjacent to the second data refresh area and time when a control signal controls the preset module to be turned on in a data write frame of a pixel circuit of a first row that extends in the second direction in the second data refresh area and is adjacent to the first data refresh area is Δt0;

wherein ΔT0>Δt1.

11. The display panel of claim 1, wherein the first data refresh area and the second data refresh area are arranged in a first direction;

a time difference between time when control signals control the preset module to be turned on in data write frames of pixel circuits of two adjacent rows that extend in the second direction in the second data refresh area is Δt2, and the second direction intersects with the first direction; and a time difference between time when a control signal controls the preset module to be turned on in a retention frame of a pixel circuit of a last row that extends in the second direction in the first data refresh area and is adjacent to the second data refresh area and time when a control signal controls the preset module to be turned on in a data write frame of a pixel circuit of a first row that extends in the second direction in the second data refresh area and is adjacent to the first data refresh area is Δt0;

wherein Δ T0>Δt2.

12. A display device, comprising a display panel, wherein the display panel comprises:

a pixel circuit and a driver circuit, wherein the pixel circuit comprises a drive module and a preset module, the preset module is configured to provide a preset signal to the drive module, and the driver circuit is configured to provide a control signal to the preset module; and a first data refresh area and a second data refresh area, wherein a data refresh frequency of the first data refresh area is F1, a data refresh frequency of the second data refresh area is F2, and F1<F2;

wherein at least part of a time period during which the display panel operates comprises a transition phase;

the transition phase is between an end of a retention frame of the first data refresh area and a start of a data write frame of the second data refresh area; and during the transition phase, the preset signal changes from a first preset signal to a second preset signal, and the control signal controls the preset module to be turned off, or the transition phase is between an end of a data write frame of the second data refresh area and a start of a retention frame of the first data refresh area; and during the transition phase, the preset signal changes from a second preset signal to a first preset signal, and the control signal controls the preset module to be turned off.

* * * * *